US00RE38938E

(19) United States
(12) Reissued Patent
Stoner et al.

(10) Patent Number: US RE38,938 E
(45) Date of Reissued Patent: Jan. 24, 2006

(54) CHRISTMAS ORNAMENT HANGER/ HOLDER

(76) Inventors: Jeffrey R. Stoner, 315 Avondale Rd., Haddonfield, NJ (US) 08033; Carol E. Stoner, 315 Avondale Rd., Haddonfield, NJ (US) 08033

(21) Appl. No.: 09/990,571

(22) Filed: Nov. 21, 2001

Related U.S. Patent Documents

Reissue of:
(64) Patent No.: 5,988,384
Issued: Nov. 23, 1999
Appl. No.: 09/244,511
Filed: Feb. 4, 1999

(51) Int. Cl.
*B65D 85/42* (2006.01)

(52) U.S. Cl. ..... 206/419; 206/806
(58) Field of Classification Search ..... 206/418, 206/419, 420, 525, 525.1, 278, 279, 289–291, 206/806; 211/85.2, 66, 113; 223/1, 85, 88
See application file for complete search history.

(56) References Cited

U.S. PATENT DOCUMENTS 1,958,230 A * 5/1934 Blechman ..... 206/289
2,054,764 A * 9/1936 Berkowitz ..... 206/291
2,097,043 A * 10/1937 Reefer ..... 206/290
3,955,675 A * 5/1976 Kurtz
4,202,451 A * 5/1980 Berkowitz ..... 206/289
4,693,369 A * 9/1987 Lagin ..... 206/289
4,995,516 A * 2/1991 Fine ..... 223/85
5,094,020 A * 3/1992 Wingfield et al. ..... 223/85
5,117,971 A * 6/1992 Fisher
5,168,985 A * 12/1992 Shih
5,511,873 A * 4/1996 Mech
5,628,398 A * 5/1997 Jackson ..... 206/289
5,642,841 A * 7/1997 Beaty ..... 223/85
5,653,339 A * 8/1997 Dobson
5,762,184 A * 6/1998 Greiner
5,884,784 A * 3/1999 Betts, Sr. ..... 206/278

* cited by examiner

*Primary Examiner*—Luan K. Bui
(74) *Attorney, Agent, or Firm*—Donald R. Piper, Jr.; Dann Dorfman Herrell & Skillman, PC

(57) ABSTRACT

A holder for storing Christmas ornaments which has a container with at least one removable side to access the inside of the container and hooks to hold a hanger on which the Christmas ornaments can be placed.

29 Claims, 1 Drawing Sheet

CHRISTMAS ORNAMENT HANGER/ HOLDER

Matter enclosed in heavy brackets [ ] appears in the original patent but forms no part of this reissue specification; matter printed in italics indicates the additions made by reissue.

BACKGROUND OF THE INVENTION

This invention relates, in general, to a container, and, in particular, to a container for hanging and holding Christmas ornaments.

DESCRIPTION OF THE PRIOR ART

In the prior art various types of holders have been proposed. For example, U.S. Pat. No. 5,117,971 to Fisher discloses a display box with a transparent structure for holding and displaying jewelry.

U.S. Pat. No. 5,168,985 to Shih discloses a box [which] *with* a lift up stand for holding jewelry.

U.S. Pat. No. 5,511,873 to Mech discloses a case for holding jewelry that has pivoted doors which open to display the contents.

U.S. Pat. No. 5,762,184 to Greiner discloses a jewelry holder with at least on*e* removable self-standing stand that can be removed from the holder.

SUMMARY OF THE INVENTION

The present invention is directed to a holder for storing Christmas ornaments which has a container with at least one removable side to access the inside of the container and hooks to hold a hanger or hangers on which the Christmas ornaments can be placed.

It is an object of the present invention to provide a new and improved holder/hanger for Christmas ornaments.

It is an object of the present invention to provide a new and improved holder/hanger for Christmas ornaments in which the ornaments can be stored safely.

It is an object of the present invention to provide a new and improved holder/hanger for Christmas ornaments in which the ornaments can be stored easily and conveniently.

It is an object of the present invention to provide a new and improved holder/hanger which will save the user time taking ornaments from the holder/hanger and placing them on a Christmas tree, and also save the user time in removing ornaments from the tree and returning them to storage.

These and other objects and advantages of the present invention will be fully apparent from the following description, when taken in connection with the annexed drawings.

DESCRIPTION OF THE PREFERRED EMBODIMENT

Figure 1:
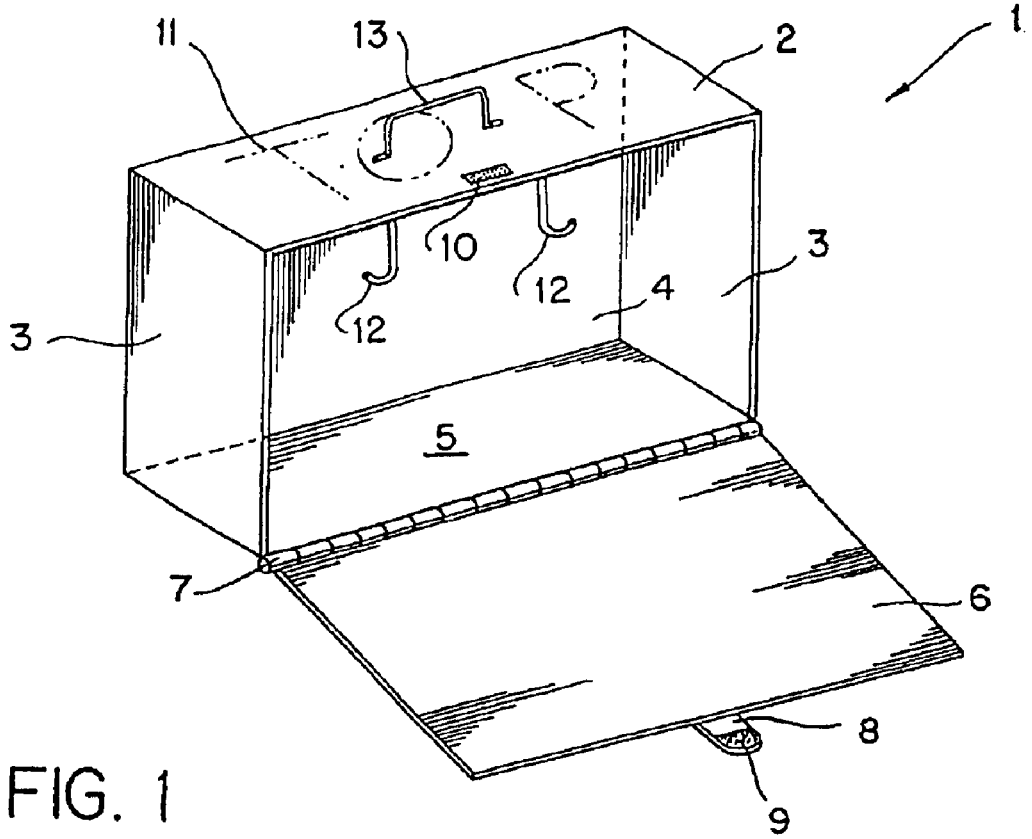
FIG. 1 is perspective view of the container of the present invention.

Referring now to the drawings in greater detail, FIG. 1 shows the container 1 part of the present invention. The container has a top2, back 4, sides 3, and a bottom 5. The container can be made from any sturdy material such as, but not limited to, cardboard or plastic. The top 2 of the container has a handle 13 which can be made unitary or integral with the top. The handle can be used to carry the container to and from a storage area. The top 2 also has indicia such as the letters "TOP" which will indicate to the user which way the containers is to be stored so the hangers 15 will not fall off the hooks 12 attached to the top 2.

The container 1 also has a front 6 which is hinged at 7 to the bottom 5 so the container can be opened to place items into, or remove items from the container. The front 6 has a catch 8 which has a fastener such as, but not limited to, VELCRO hook and loop fasteners 9 which cooperated with a fastener10 on the top 2 to fasten the front 6 closed.

Figure 2:
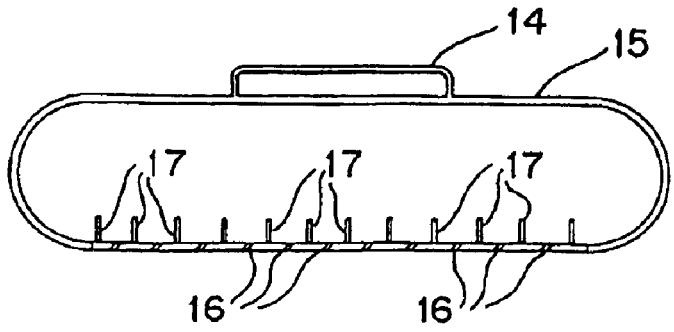
FIG. 2 is [a perspective] *an elevational* view of the hanger used with the present invention.

[Or] *On* an inside surface of the top 2 [is] *are* fastened a plurality of hooks 12 which will hold the hanger shown in FIG. 2. It should be noted that although only two hooks 12 are shown, any number of hooks can be attached to the top without departing from the scope of the present invention.

As shown in FIG. 2, a hanger 15 which will be used to securely fasten the items, such as Christmas ornaments, within the containers. The hanger has a closed loop 14 which will slide onto the hooks 12 which will support the hangers 15 within the container. The hanger 15 has a series of ridges or corrugations 16 which will provide a place to place the hooks, that are normally attached to Christmas ornaments. By providing these ridges or corrugations 16 on the hanger, the ornaments can be easily and quickly hooked onto the hanger between the ridges or corrugations16 which will securely hold the ornaments during storage and prevent the ornaments from sliding along the hanger and becoming tangled or dislodged and lost. In this way the hooks attached to the Christmas ornaments will not become lost or tangled during storage. As shown in FIG. 2, a plurality of fingers or projections 17 which will be placed along the lower portion of the hanger, and can be used to hold ornaments which have "looped" hangers. This will, therefore, provide a convenient storage container for Christmas ornaments and will make the job of placing ornaments on a tree and removing them from the tree and placing them in storage an easier task.

Also, it should be noted that other indicia could be placed on the container such as "Fragile" or decorative holiday printing to indicate the contents of the container. This would aid in retrieving the proper container from storage.

Although the Christmas Ornament Hanger/Holder and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A container for storing [Christmas] ornaments, said container comprising:

a box having a top, sides, back, bottom and an open front, a front portion hinged to said bottom, said front portion being movable from a first position in which said front portion closes said open front of said box to a second position in which said front portion uncovers said open front of said box, means for holding said front portion in said first position, said top of said box having an inside surface and an outside surface, support means for holding a hanger mounted on said inside surface of said top of [sail] *said* box, and a hanger means for holding [Christmas] ornaments detachably secured to said support means, said hanger means having means for engaging said support means for securing said hanger means on said support means, said hanger means having a top portion and a bottom portion, said bottom portion having a plurality of ridges [space] *spaced* therealong.

2. The container for storing [Christmas] ornaments as claimed in claim 1, wherein said support means is at least one hook.

3. The container for storing [Christmas] ornaments as claimed in claim 1, wherein said bottom portion also has a plurality of upstanding projections extending therefrom for attaching looped ornament hangers.

*4. An ornament holder, comprising:*

*a container having an opening and inside walls;*

*a closure releasably openable relative to the container, the closure adapted to enclose the opening;*

*a hanger support disposed inside the container; and*

*a hanger removably mountable relative to the hanger support to provide an open region between the hanger and at least one of the inside walls of the container,*

*the hanger being configured to be mountable onto and removable from the hanger support, the hanger adapted to hold an ornament, the hanger having at least one retainer disposed along the hanger intermediate ends of the hanger for limiting sliding displacement of the ornament along the hanger,*

*wherein the hanger comprises a support bar and the at least one retainer includes a plurality of ridges spaced therealong.*

*5. The ornament holder of claim 4, wherein the closure is hingeably mounted to the container.*

*6. The ornament holder of claim 4, wherein the closure is pivotally connected to the container.*

*7. The ornament holder of claim 4, comprising a fastener to fasten the closure to the container.*

*8. The ornament holder of claim 7, wherein the fastener is mounted externally to the container.*

*9. The ornament holder of claim 4, wherein the ridges are adapted to retain an ornament to prevent the ornament from sliding along the bar.*

*10. The ornament holder of claim 4, wherein the hanger comprises a plurality of fingers spaced therealong.*

*11. The ornament holder of claim 10, wherein the fingers are adapted to retain an ornament so as to enable the ornament to hang from the fingers.*

*12. The ornament holder of claim 4, wherein the hanger support comprises a hook.*

*13. The ornament holder of claim 4 wherein the hanger is mountable on the hanger support to provide the open region between the hanger and the inside wall of the container opposite the opening.*

*14. The ornament holder of claim 4 wherein the container includes a front and a rear and wherein the opening is provided on the front generally opposite the rear of the container to define a depth therebetween.*

*15. The ornament holder of claim 14 wherein the hanger comprises a rod for holding an ornament, the rod having a thickness less than the depth of the container.*

*16. The ornament holder of claim 15 wherein the hanger is mountable on the hanger support to provide the open region between the hanger and the rear of the container.*

*17. The ornament holder of claim 4, wherein the closure is mounted relative to the container and wherein the closure is moveable from a first position in which the closure covers the opening of the container to a second position which provides access inside of the container.*

*18. The ornament holder of claim 4 wherein the hanger is configured to be slidably mountable onto the hanger support.*

*19. An ornament holder, comprising:*

*A. a container having an opening and inside walls;*

*B. a closure adapted for covering the opening;*

*C. a support bar removably mountable inside the container for enabling ornaments to be removably hung on the support bar; and*

*D. a plurality of retainers spaced along the support bar, said retainers extending outwardly from the support bar to limit sliding displacement of ornaments along the support bar and to maintain a distribution of the ornaments along the length of the support bar,*

*wherein the retainers comprise a series of ridges extending outwardly from the support bar and forming a plurality of shortened spans on the support bar between the ridges, said spans being adapted to support the ornaments, and said ridges being adapted to limit sliding displacement of the ornaments on the spans.*

*20. The ornament holder of claim 19, wherein the closure is hingeably mounted to the container.*

*21. The ornament holder of claim 19, wherein the closure is pivotally connected to the container.*

*22. The ornament holder of claim 21, wherein the closure is movable between a first position, in which the closure covers the opening of the container, and a second position, in which the opening is exposed to provide access inside of the container.*

*23. The ornament holder of claim 19, comprising a releasable fastener to fasten the closure to the container.*

*24. The ornament holder of claim 19, comprising a hanger support mounted on at least one of the inside walls of the container, said hanger support comprising two or more support mounts for removably supporting the support bar inside the container.*

*25. The ornament holder of claim 24, wherein the support mounts comprise a pair of hooks connected to at least one of the inside walls in the container.*

*26. The ornament holder of claim 24, wherein the support mounts are centrally located on one of the inside walls to support the support bar in a position spaced away from the other inside walls and the opening.*

*27. The ornament holder of claim 19, wherein the retainers comprise a series of fingers extending outwardly and generally perpendicularly from the support bar.*

*28. The ornament holder of claim 19 comprising a handle on the exterior of the container.*

*29. The ornament holder of claim 19, comprising a hanger support disposed on the inside walls of the container and wherein the support bar is configured to be slidably mountable on the hanger support.*

* * * * *